United States Patent [19]

Henson

[11] 4,330,136
[45] May 18, 1982

[54] PACKING FOR MAKING CLOSED LOOP SEAL

[75] Inventor: Robert W. J. Henson, Ashford, England

[73] Assignee: The Beldam Packing & Rubber Company Limited, Brentford, England

[21] Appl. No.: 149,463

[22] Filed: May 13, 1980

[51] Int. Cl.³ .............................................. F16J 15/06
[52] U.S. Cl. ................................ 277/228; 277/229; 277/DIG. 6; 428/36
[58] Field of Search ................. 277/DIG. 6, 227–230; 428/35, 36, 188; 264/501, 563, 173, 326

[56] References Cited

U.S. PATENT DOCUMENTS

| | | | |
|---|---|---|---|
| 124,846 | 3/1872 | Murfey | 277/227 |
| 868,136 | 10/1907 | Shields | 277/228 X |
| 2,144,082 | 1/1939 | Randall | 277/230 X |
| 2,597,976 | 5/1952 | Cousins | 277/229 X |
| 3,031,357 | 4/1962 | Balkin et al. | 277/229 X |
| 3,934,889 | 1/1976 | Smith | 277/229 X |
| 4,147,274 | 4/1979 | Hall et al. | 277/228 X |

FOREIGN PATENT DOCUMENTS

| | | | |
|---|---|---|---|
| 2142 | of 1903 | United Kingdom | 277/229 |
| 454649 | 7/1935 | United Kingdom | 277/230 |
| 953670 | 3/1964 | United Kingdom | 277/230 |
| 1088697 | 10/1967 | United Kingdom | 277/229 |
| 1116835 | 6/1968 | United Kingdom | 277/229 |
| 1377171 | 12/1974 | United Kingdom | 277/230 |

OTHER PUBLICATIONS

"Pilot Lidpack 3500," brochure, Beldam Packing and Rubber Company Limited, Gr. Britain, 4 pp.
"Tankatite Type 4," leaflet, 1 p.

Primary Examiner—Robert S. Ward, Jr.
Attorney, Agent, or Firm—Wigman & Cohen

[57] ABSTRACT

A packing particularly for marine cargo tank lids has a resilient core, a fibrous body enclosing the core, a protective outer layer preferably of PTFE, and an impervious layer between the body and the core and/or between the body and the outer layer. At least the body is of a weldable thermoplastic material so that the packing can be formed into a closed loop by welding the ends of a length of packing.

11 Claims, 1 Drawing Figure

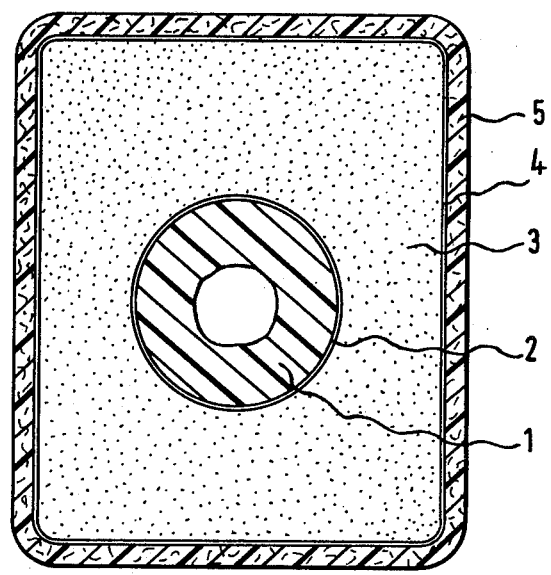

PACKING FOR MAKING CLOSED LOOP SEAL

BACKGROUND OF THE INVENTION

1. Field of the Invention

This invention relates to packings and has particular but not exclusive reference to packings for use between the lid and body of a tank, for sealing the lid.

2. Description of the Prior Art

The packings in use at present for sealing the lids of tanks used to contain solvents and other liquid chemicals, e.g. on board ships, are in general made from plaited asbestos yarn impregnated with polytetrafluoroethylene (PTFE). Although these are resistant to most of the chemicals normally encountered, for example, in industrial or marine applications, the packings rapidly acquire a set and consequently leakage can occur after a lid (for example, a ship's cargo tank cover) has been opened and closed several times during service. Such packings are manufactured in a continuous length and are cut to the required length of the lid before being fitted. This means that leakage can also occur at the joint, particularly if this is not accurately cut or if shrinkage occurs during service thereby allowing the joint to open.

SUMMARY OF THE INVENTION

It is an object of the present invention to provide a packing, which can form an endless seal, and which is resilient so that it will fully recover its initial shape when sealing pressure is released, and will not acquire a permanent set.

According to the invention, there is provided a resilient packing comprising a resilient core, a body of fibrous material enclosing the core, a physically protective outer layer, and a layer of substantially impervious material between the body and at least one of the outer layer and the core.

Preferably, at least one layer of substantially impervious flexible sheet, film, tape or the like is provided between the body and the outer braid.

The core may, for example, be made from a rubber. The core may have an outer covering of impervious flexible sheet, film tape or the like between it and the fibrous body of the packing.

BRIEF DESCRIPTION OF THE DRAWING

The drawing accompanying this specification shows, by way of example only, a cross section of a preferred form of packing embodying the invention.

DETAILED DESCRIPTION OF THE PREFERRED EMBODIMENT

The illustrated packing has a resilient chemically resistant rubber core 1, which may for example, be a hollow rubber extrusion as illustrated, soft solid rubber, or sponge rubber. The core constitutes a resilient internal cushion.

The core is wrapped with PTFE tape 2 to protect the core against any chemicals which may penetrate the outer regions of the packing.

Enclosing the wrapped core is a body 3, for example of braided or plaited chemically resistant fibrous material, for example, polypropylene or other synthetic fiber or yarn.

The body has a wrapping of spirally or longitudinally arranged tape 4 in one or more layers, made of PTFE or other chemically resistant material, to give protection against attack or contamination by chemicals contained in a vessel or container to which the packing is to be applied. The packing, and in particular the outer tape layer, is protected from physical damage, by a fine outer braid 5 of mechanically and chemically resistant yarn, for example, PTFE, polypropylene or asbestos.

The packing described is resistant to commonly encountered chemicals and will not become soft when contacted thereby. Conversely it will not contaminate liquid chemicals commonly encountered, for example, in tankers and bulk cargo vessels. It can be used with acids, alkalis, oils, solvents, general chemicals, and edible products.

For service which is known to be less arduous, simpler forms of packing can be used. The outer tape wrapping 4 and braid 5 can be omitted and the exterior of the packing can be covered with a vulcanised synthetic rubber or similar protective coating. Alternatively, in some cases the inner tape wrapping 2 may be omitted.

The cross sectional shape of the packing can be square, rectangular, circular or any other shape required for a particular application.

In use, the packing will in general form a closed loop fitted into a groove of a lid or cover, or a groove surrounding an opening of a container to be closed by a lid or cover.

To form a closed loop, the cut ends of the packing can be welded together, for example, by placing the end faces of the packing on a hot plate or other suitable heating device at a temperature to melt the thermoplastic constituents of the packing, for example, the synthetic fibre of the body, and forcing the end faces together to form a weld. To protect the weld region, the outside of the packing can be wrapped with a layer of PTFE tape which in turn is protected by a winding of PTFE yarn.

The welding of the packing to form a closed loop can be carried out on site, or packings can be supplied ready welded by the manufacturer or supplier. The length of the loop is preferably slightly greater than that of the groove into which it is to be fitted, so that the packing is fitted under longitudinal compression.

I claim:

1. A resilient packing comprising a resilient core providing complete recovery after compression, a body of weldable fibrous material enclosing the core, a physically protective outer layer, and a layer of substantially impervious material between the body and the outer layer.

2. A packing as claimed in claim 1 in which the protective outer layer is a protective coating.

3. A packing as claimed in claim 1 in which the protective outer layer is a braid.

4. A packing as claimed in claim 3, wherein at least one layer of said substantially impervious material is selected from flexible sheet, film, and tape, and is provided between the body and the outer braid.

5. A packing as claimed in claim 4, wherein said at least one layer of substantially impervious material consists of PTFE.

6. A packing as claimed in claim 3, 4 or 5, wherein the braid consists of PTFE, polypropylene or asbestos.

7. A packing as claimed in claim 1 wherein the core has an outer covering of impervious material selected from flexible sheet, film and tape between it and the fibrous body of the packing.

8. A packing as claimed in claim 7, wherein said outer covering consists of PTFE.

9. A packing as claimed in claim 1, 4, or 7 wherein the core is composed of rubber.

10. A packing as claimed in claim 1, 4, or 7 wherein the body consists of thermoplastic fibre or yarn.

11. A packing as claimed in claim 1, 4, or 7 wherein the form of an endless loop is made by welding together the thermoplastic material of the packing at the ends of a length of the packing.

* * * * *